United States Patent [19]

Kuhn

[11] Patent Number: 5,083,027

[45] Date of Patent: Jan. 21, 1992

[54] APPARATUS FOR AND METHOD OF MEASURING ELECTRONS

[75] Inventor: Othmar Kuhn, Wohlen, Switzerland

[73] Assignee: Inotech AG, Wohlen, Switzerland

[21] Appl. No.: 545,394

[22] Filed: Jun. 28, 1990

[30] Foreign Application Priority Data

Jun. 29, 1989 [DE] Fed. Rep. of Germany ....... 3921377

[51] Int. Cl.$^5$ ............................................... G01T 1/29
[52] U.S. Cl. .................................................... 250/374
[58] Field of Search ........................... 250/385.1, 374

[56] References Cited

U.S. PATENT DOCUMENTS

| | | | |
|---|---|---|---|
| 4,311,908 | 1/1982 | Goulianos et al. | 250/374 |
| 4,336,455 | 6/1982 | Bryant | 250/385.1 |
| 4,594,512 | 6/1986 | Sasaki | 250/385.1 |

Primary Examiner—Carolyn E. Fields
Assistant Examiner—Drew A. Dunn
Attorney, Agent, or Firm—Bachman & LaPointe

[57] ABSTRACT

For measuring the levels of beam intensity on surfaces the testpiece is disposed as close as possible to a location-sensitive proportional counting tube and overlaid with counting gas. The electron avalanche in the counting tube, which occurs subsequent to disassociation due to gas amplification is registered in such a way as to identify position. Because of the divergence of the particle beam from the testpiece, the degree of locational resolution of the counting tube is however insufficient for the analysis of certain isotopes. The apparatus according to the invention improves the degree of locational resolution by means of mechanical collimators which are adapted to the size of the testpiece and which in that dimension decrease continuously or in steps towards the electrode, without in that respect reducing the formation of an electron avalanche, which is precisely linked to position, on the counting wire.

12 Claims, 1 Drawing Sheet

APPARATUS FOR AND METHOD OF MEASURING ELECTRONS

BACKGROUND OF THE INVENTION

The invention relates to a method and apparatus for measuring the intensity of beams, in particular radioactive beams on surfaces.

For the measurement of levels of intensity of complex radioactive beams on surfaces such as chromatographs in analytical chemistry, it is nowadays conventional practice to use the technique of location-sensitive counters with positively charged counting wire.

In that procedure the particles which are emitted by the surface reach a gas-filled counting tube from below through an open entry window. Due to gas amplification, an electron avalanche is produced in the counting tube, the avalanche corresponding in respect of time and location to the position of the incident particles.

The counting pulses can be electromagnetically coupled into a delay line. The pulses pass along the delay line in both directions and the arrival of the pulses is electronically registered at each end of the delay line.

The time difference between the arrival of the two associated pulses, at the left and at the right, is a direct measurement in respect of the location of an incident particle.

The electron avalanche is delineated in respect of position by the voltage and the divergence of the particle beam from the point on the surface to be measured. While the inherent resolution, which is directly voltage-dependent, of the present day counting tubes, at a value of 0.2 mm, is sufficiently accurate, the degree of resolution in dependence on the particle beam with isotopes such as P-32, Cr-51, etc, with a resolution of several millimeters, is totally inadequate.

In order to achieve good spatial resolution, in accordance with present day techniques, the material to be measured is disposed as close as possible to the counting tube. However that spacing is subject to an absolute limit insofar as a minimum high tension must be maintained in the proportional counting tube between the testpiece and the counting tube.

In addition, the attempt is made nowadays to improve the level of resolution by electronic controls in respect of the pulse lengths. However the electronic control procedure causes losses in respect of the detectable particles (loss of efficiency), which, in the case of sources such as the frequently used H-3 and J-125, gives rise to measurement losses of 50% and more.

SUMMARY OF THE INVENTION

The present invention seeks to improve the measurement of discrete radioactive radiation on surfaces by means of a mechanical apparatus without adversely affecting the level of resolution of the counting tube or reducing the counting output or yield thereof. In particular the invention seeks to provide that for that purpose the apparatus according to the invention optimizes the level of resolution by means of mechanical collimators.

That is achieved in that a receiving chamber for a testpiece with a grounded plate has an anode passing thereover at a spacing therefrom and an adjustable high tension is applied between the anode and the plate, wherein a delay line extends on the side of the anode remote from said plate and the receiving chamber is reduced towards the anode.

For that purpose it has been found desirable for the receiving chamber which, in accordance with further features of the invention, is reduced towards the anode in a step-like configuration or funnel-like configuration, to be substantially adapted to the size of the testpiece.

BRIEF DESCRIPTION OF THE DRAWINGS

The present invention will be more readily understood from the accompanying drawings wherein.

DETAILED DESCRIPTION

Figure 1:
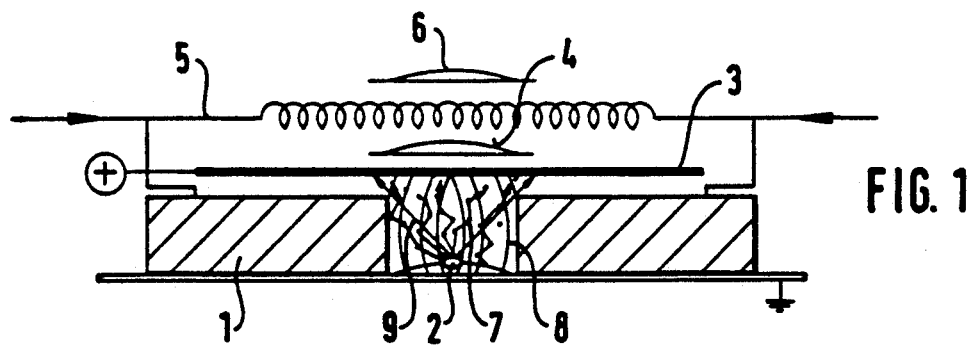
FIGS. 1-5 are sectional views of the apparatus of the present invention showing preferred embodiments.

Further advantages, features and details of the invention will be be apparent from the following description of preferred embodiments of apparatuses with different receiving chambers 10, as illustrated in the five sectional views shown in the accompanying drawings.

Reference numeral 1 identifies a grounded plate on which a testpiece 2 is arranged. An anode 3 of wire type or disc or plate type extends over the plate 1 at a spacing therefrom and the trajectories of particles emanating from the testpiece 2 in the direction of the anode 3 are kept free and clear. An adjustable high tension is applied between the plate 1 and the anode 3, over which extends a delay line 5. Positive particles (positive ions) or particles which are separated off the testpiece 2 are retained on the grounded plate 1 while negative particles (electrons) 7 which are decisive for a counting procedure are attracted by the anode and are substantially diverted towards same along the field lines 8 produced.

The pulse which occurs at the anode 3 and which is indicated at 4 induces in the delay line 5 an electronically manipulated signal 6. With increasing voltage, a larger number of electrons can be caught, while at the same time a cloud of electrons which occurs to an increased degree causes a lower degree of resolution.

It is thus possible to increase the voltage on the counting wire and to catch a rising number of electrons without at the same time increasing the cloud of electrons occurring at the counting wire, as the mechanical collimators restrict the divergence of the particle beam 9.

In the gas-filled internal space of the receiving chamber 10 of the apparatus, the free path of movement for an emitted particle in all directions (2-Pi geometry) is sufficiently large to produce a sufficient number of electrons for generation of a pulse on the counting wire. The geometrical shape of the apparatus is also such that the field lines 8 of the electromagnetic field emanating from the counting wire pass relatively unimpededly through the gas-filled internal space 10.

Figure 2:
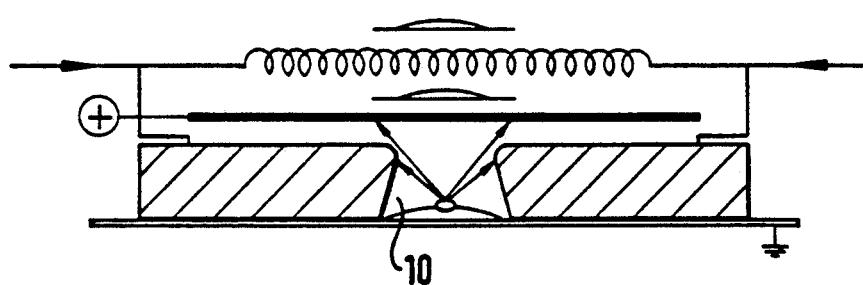
Figure 3:
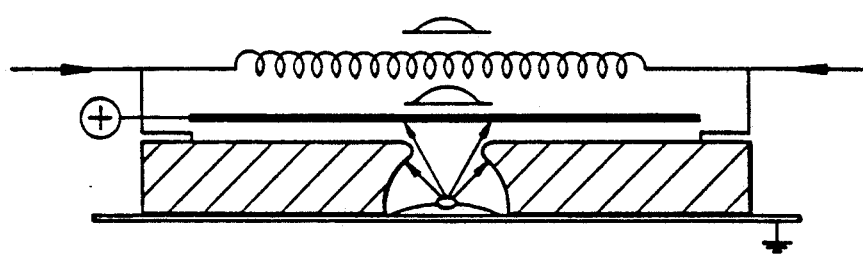
Figure 4:
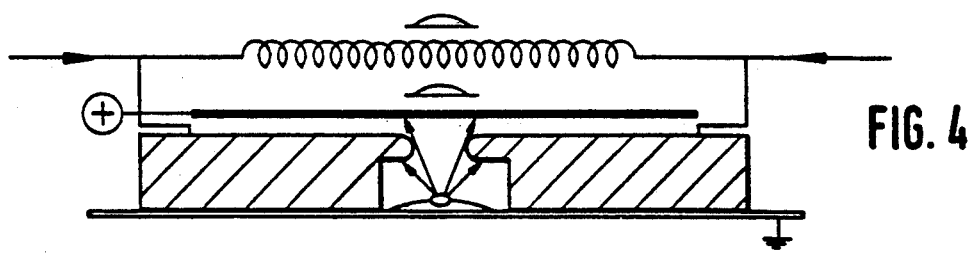
Figure 5:
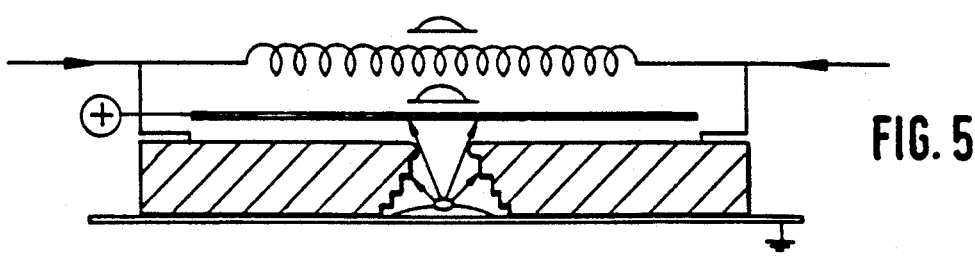

FIG. 2 shows the receiving chamber 10 reduced in a nozzle-like configuration towards the anode 3. FIG. 3 shows the receiving chamber 10 reduced in a funnel-like configuration towards the anode 3. FIG. 3 also shows the receiving chamber 10 reduced towards the anode 3, forming a part-spherical inside surface. FIG. 4 shows the cross-section of the receiving chamber 10 reduced towards the anode 3 by a step which projects in an annular configuration out of the chamber wall. FIG. 5 shows the receiving chamber 10 reduced by virtue of a plurality of steps.

I claim:

1. Apparatus for measuring the intensity of radioactive beams on surfaces which comprises: a grounded plate comprising means for supporting a radioactive testpiece; a receiving chamber adjacent the grounded plate and shaped so as to receive a testpiece; an anode disposed so as to pass over the testpiece and chamber at a spacing therefrom; and means for applying a high tension between the anode and the plate to produce field lines therebetween; whereby electrons are attracted by the anode along the field lines.

2. Apparatus as set forth in claim 1 including a delay line extending on the side of the anode which is remote from the grounded plate.

3. Apparatus as set forth in claim 2 wherein the receiving chamber is reduced in a nozzle-like configuration towards the anode.

4. Apparatus as set forth in claim 3 wherein the receiving chamber is reduced in a funnel-like configuration towards the anode.

5. Apparatus as set forth in claim 3 wherein the receiving chamber is reduced towards the anode, forming a part-spherical inside surface.

6. Apparatus as set forth in claim 3 wherein the cross-section of the receiving chamber is reduced towards the anode by a step which projects in an annular configuration out of the chamber wall.

7. Apparatus as set forth in claim 3 wherein the receiving chamber is reduced by virtue of a plurality of steps.

8. Apparatus as set forth in claim 2 wherein the receiving chamber is a chamber in the grounded plate which receives the testpiece.

9. Apparatus as set forth in claim 2 wherein the receiving chamber includes a gas-filled internal space.

10. Apparatus as set forth in claim 2 wherein the means for applying a high tension induces an electronically manipulated signal in the delay line with a pulse occurring on the anode.

11. A method of measuring the intensity of radioactive beams on surfaces which comprises: providing an apparatus including a grounded plate, placing a testpiece in a receiving chamber adjacent the grounded plate and an anode passing over the testpiece and grounded plate; applying a high tension between the anode and the plate to produce field lines therebetween; and attracting electrons from the testpiece diverted along the field lines to the anode.

12. A method as set forth in claim 11 wherein an electronically manipulated signal is induced in a delay line with a pulse occurring on the anode.

* * * * *